United States Patent
Uramichi

(10) Patent No.: US 6,722,738 B2
(45) Date of Patent: Apr. 20, 2004

(54) RECLINING DEVICE FOR A SEAT

(75) Inventor: Hideki Uramichi, Toyota (JP)

(73) Assignee: Araco Kabushiki Kaisha, Toyota (JP)

( * ) Notice: Subject to any disclaimer, the term of this patent is extended or adjusted under 35 U.S.C. 154(b) by 132 days.

(21) Appl. No.: 10/043,248

(22) Filed: Jan. 14, 2002

(65) Prior Publication Data

US 2002/0096925 A1 Jul. 25, 2002

(30) Foreign Application Priority Data

Jan. 19, 2001 (JP) ........................................ 2001-011842

(51) Int. Cl.[7] ................................................. B60N 2/22
(52) U.S. Cl. ........................................ 297/367; 297/366
(58) Field of Search ........................... 297/354.12, 366, 297/367, 368, 369, 378.12

(56) References Cited

U.S. PATENT DOCUMENTS

| | | | | |
|---|---|---|---|---|
| 5,590,931 A | * | 1/1997 | Fourrey et al. | 297/366 |
| 5,622,407 A | * | 4/1997 | Yamada et al. | 297/366 |
| 5,779,313 A | * | 7/1998 | Rohee | 297/367 |
| 5,785,386 A | | 7/1998 | Yoshida | |
| 5,813,724 A | | 9/1998 | Matsuura et al. | |
| 5,984,413 A | * | 11/1999 | Baloche et al. | 297/367 |
| 6,082,821 A | * | 7/2000 | Baloche et al. | 297/354.12 |
| 6,112,370 A | * | 9/2000 | Blanchard et al. | 16/325 |
| 6,325,458 B1 | * | 12/2001 | Rohee et al. | 297/367 |
| 2002/0024246 A1 | | 2/2002 | Yamada et al. | |

FOREIGN PATENT DOCUMENTS

| | | |
|---|---|---|
| JP | 8-253063 | 10/1996 |
| JP | 09-131237 | 11/1996 |
| JP | 9-131237 | 5/1997 |
| JP | 3115231 | 9/2000 |
| JP | 3-115231 | 12/2000 |

* cited by examiner

*Primary Examiner*—Peter M. Cuomo
*Assistant Examiner*—Stephen Vu
(74) *Attorney, Agent, or Firm*—Oliff & Berridge, PLC

(57) ABSTRACT

A reclining device has leg portions formed in opposed end portions of each of slide pawls. Basically, a rotating cam bears the slide pawl at a middle bearing portion formed in a middle portion between the leg portions. Furthermore, the rotating cam bears the slide pawl also at the leg portions. Such a three-point supporting structure prevents the middle portion of a slide pawl body from deflecting radially inwardly even in the event of application of a turning force from an annular ratchet. Thus, the slide pawls are stably maintained in mesh with the ratchet.

10 Claims, 8 Drawing Sheets

RECLINING DEVICE FOR A SEAT

INCORPORATION BY REFERENCE

The disclosure of Japanese Patent Application No. 2001-11842 filed on Jan. 19, 2001 including the specification, drawings and abstract is incorporated herein by reference in its entirety.

BACKGROUND OF THE INVENTION

1. Field of Invention

The invention relates to a reclining device. More specifically, the invention relates to the fitting of a seat back and a seat cushion.

2. Description of Related Art

A reclining device of a certain type is disclosed, for example, in Japanese Patent Application Laid-Open No. 8-253063. This reclining device is designed such that a cam body presses a plurality of slide pawls each having outer teeth on the front end side against an annular ratchet having inner teeth on the inner periphery side so that the slide pawls are brought into mesh with the ratchet and locked with respect thereto. Further, the operation of pressing the slide pawls against the ratchet is canceled by applying an arbitrary operational force to the cam body so that the slide pawls are retreated from the ratchet and brought out of mesh therewith.

The reclining device of this type is designed to prevent the ratchet from rotating relative to a holder when the slide pawls are locked with respect to the ratchet and to allow the ratchet to rotate relative to the holder when the slide pawls are unlocked from the ratchet. The reclining device of this type is disposed between a rear end portion of a seat cushion and a lower end portion of a seat back, thus constituting a vehicular reclining seat. For example, the reclining device of this type is designed such that the seat back is longitudinally tiltably supported with respect to the seat cushion by mounting the ratchet on the lower end side of the seat back and the holder on the rear end side of the seat cushion.

It is to be noted herein that the reclining device of this type confronts the following problem. If a great circumferential turning force is applied to the seat back constituting the reclining seat, the ratchet is also exposed to a great circumferential turning force, which acts on the slide pawls as radial and tangential components in the circumferential direction. The slide pawls are displaced both radially inwardly and circumferentially. As a result, the slide pawls may be brought out of mesh with the ratchet. Thus, the reclining device of this type requires that the slide pawls securely mesh with the ratchet when the slide pawls are locked with respect to the ratchet.

However, the reclining device according to the related art as disclosed in the aforementioned patent publication is designed to bear each of the slide pawls only at a single point, namely, at the center of a rear end portion thereof. Hence, if a great circumferential turning force is applied to the slide pawls from the ratchet, each of the slide pawls sways circumferentially upon its bearing portion for the cam body and becomes quite unstable although it is still maintained in mesh with the ratchet. Then, the slide pawls may be retreated from the ratchet, disengaged therefrom, and unlocked therefrom.

SUMMARY OF THE INVENTION

The invention thus improves the reclining device of the above-mentioned type such that the slide pawls are stably maintained in mesh with the ratchet and cannot be disengaged therefrom easily even if a great circumferential turning force is applied to the slide pawls from the ratchet. To achieve this object, the reclining device of the invention adopts a construction capable of securely maintaining the slide pawls in mesh with the ratchet, taking into account the configuration of the slide pawls and the manner in which the cam body bears the slide pawls.

A reclining device according to one exemplary aspect of the invention comprises a plurality of pawls, an annular ratchet, a cam body, and a holder. Each of the pawls has outer teeth formed on the front end side, first and second leg portions formed at opposed end portions, and a bearing portion formed between the first and second leg portions. The first and second leg portions extend toward the rear end side. The annular ratchet has inner teeth formed on the inner periphery side. The cam body comes into abutment at least on the bearing portion of each of the pawls and possibly on the leg portions and the bearing portion of each of the pawls. The cam body presses the pawls toward the ratchet so that the pawls are brought into mesh with the ratchet and locked with respect thereto and stops pressing the pawls so that the pawls are retreated from the ratchet and unlocked therefrom. The holder holds each of the pawls such that the pawl can move toward and away from the inner teeth of the ratchet, and rotates concentrically with respect to the ratchet. The cam body, which operates by an arbitrary operational force, releases the pressing force applied to the slide pawls and brings them out of mesh with the ratchet. The reclining device is designed to prevent the ratchet from rotating relative to the holder when the slide pawls are in mesh with the ratchet and to allow the ratchet to rotate relative to the holder when the slide pawls are out of mesh with the ratchet.

BRIEF DESCRIPTION OF THE DRAWINGS

The above mentioned and other objects, features, and advantages, and technical industries significant of this invention would be better understood by reading and following the detail description preferred embodiments of the invention, when considered in connection with the accompany drawings, in which.

DETAILED DESCRIPTION OF PREFERRED EMBODIMENTS

Figure 1:
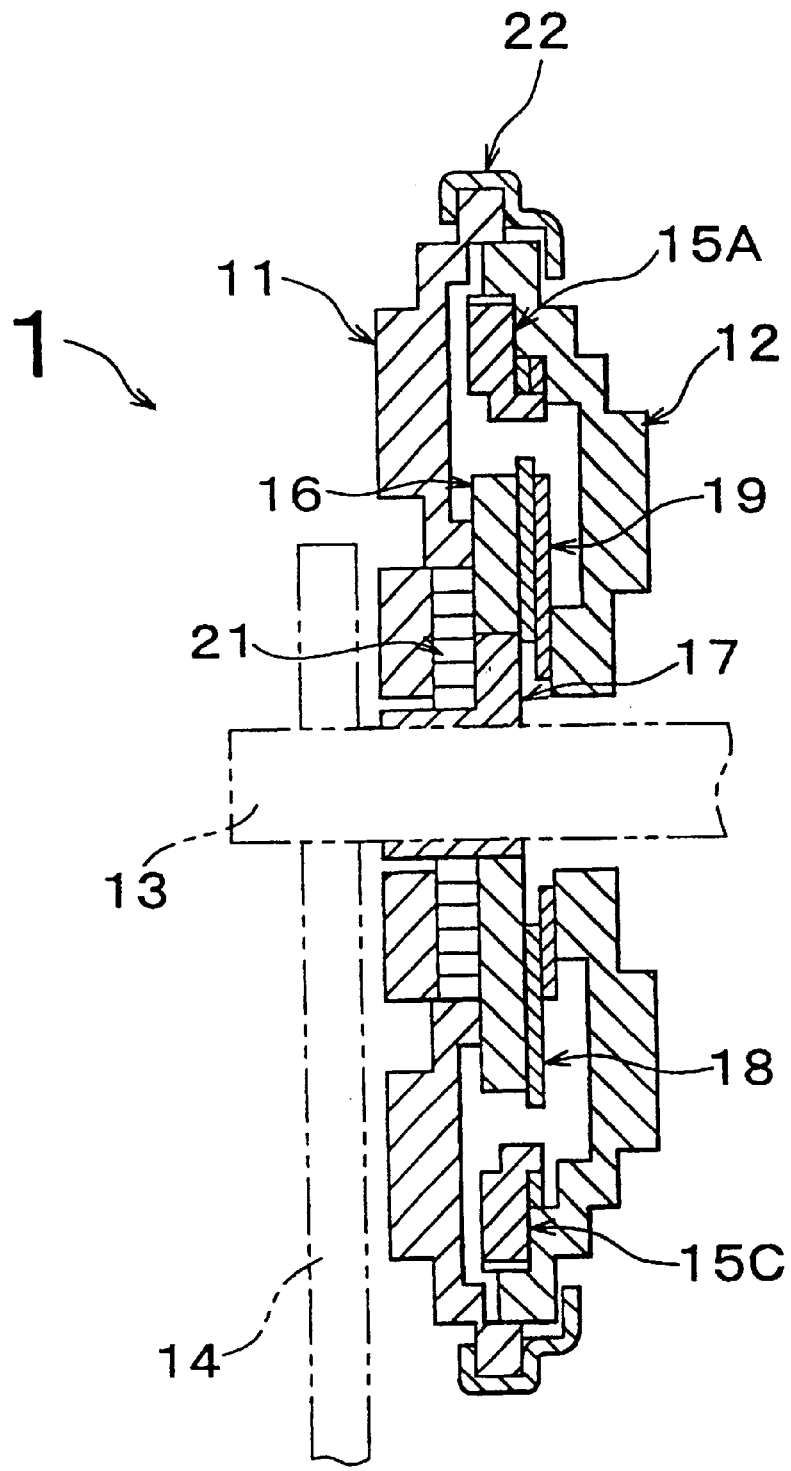
FIG. 1 is a longitudinal sectional view of a reclining device according to one exemplary example of the invention.
Figure 2:
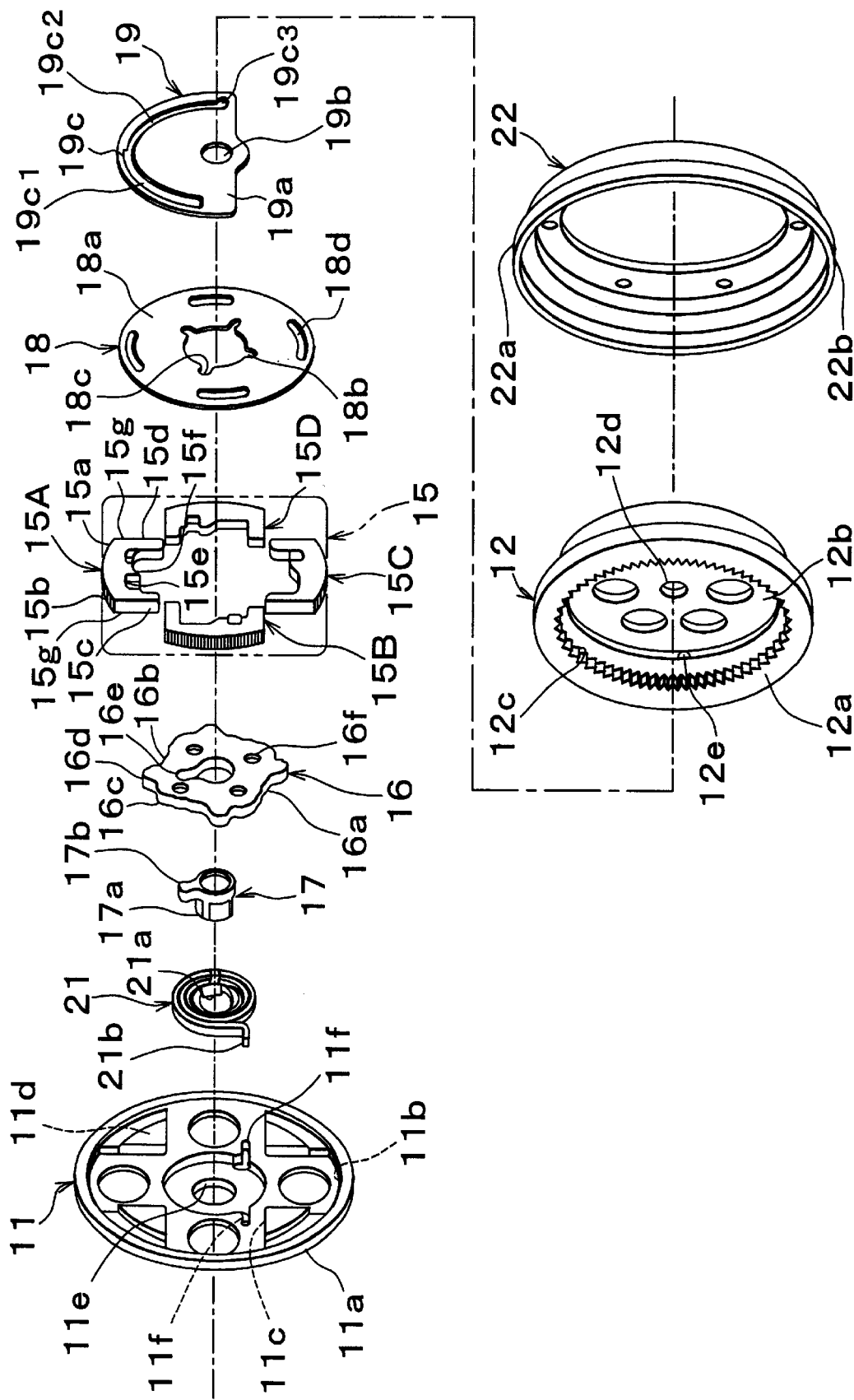
FIG. 2 is an exploded perspective view showing how component members of the reclining device are arranged.
Figure 3:
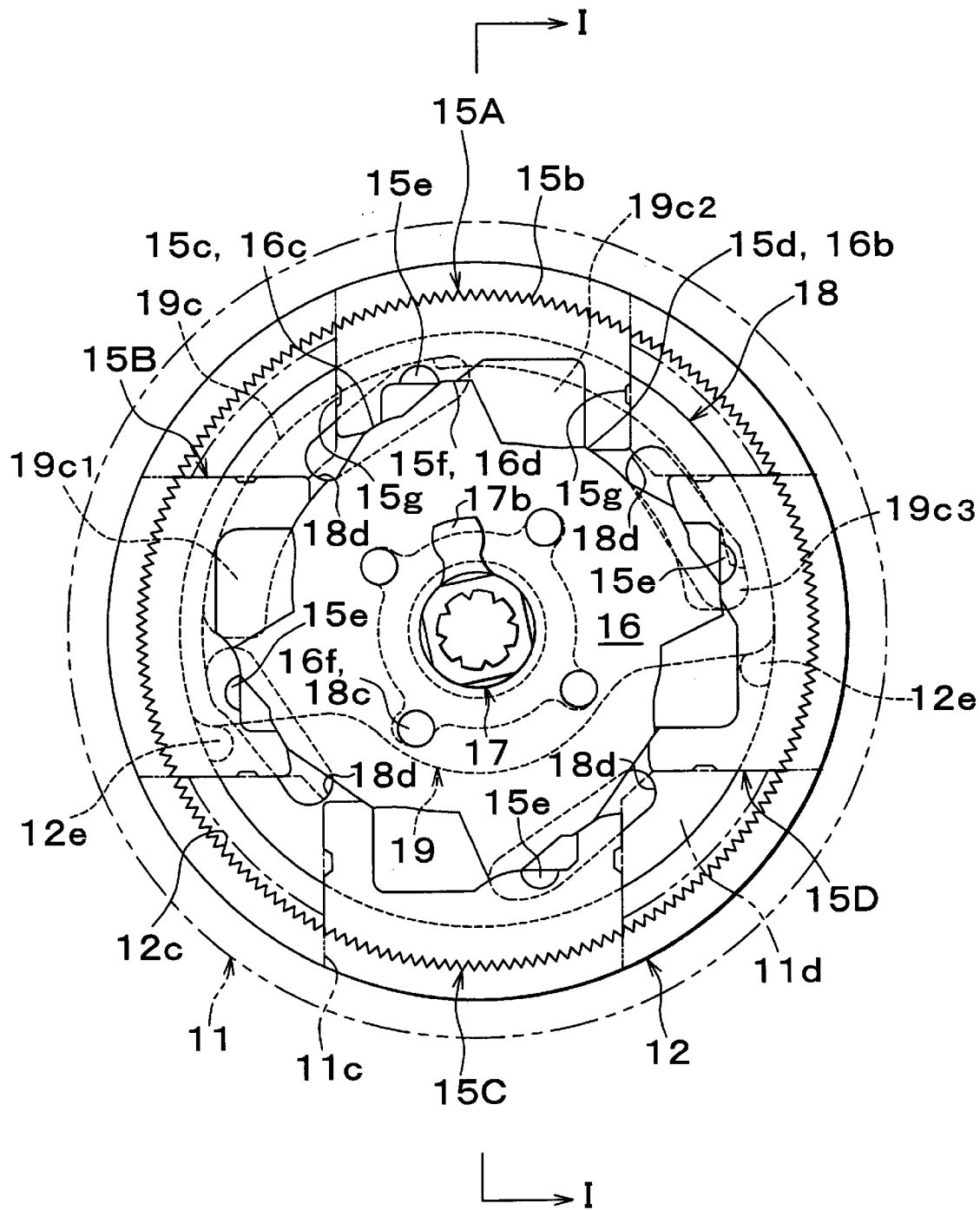
FIG. 3 is a front view of the reclining device that has been removed of some of the component members and that is in a state where slide pawls are in mesh with a ratchet.
Figure 4:
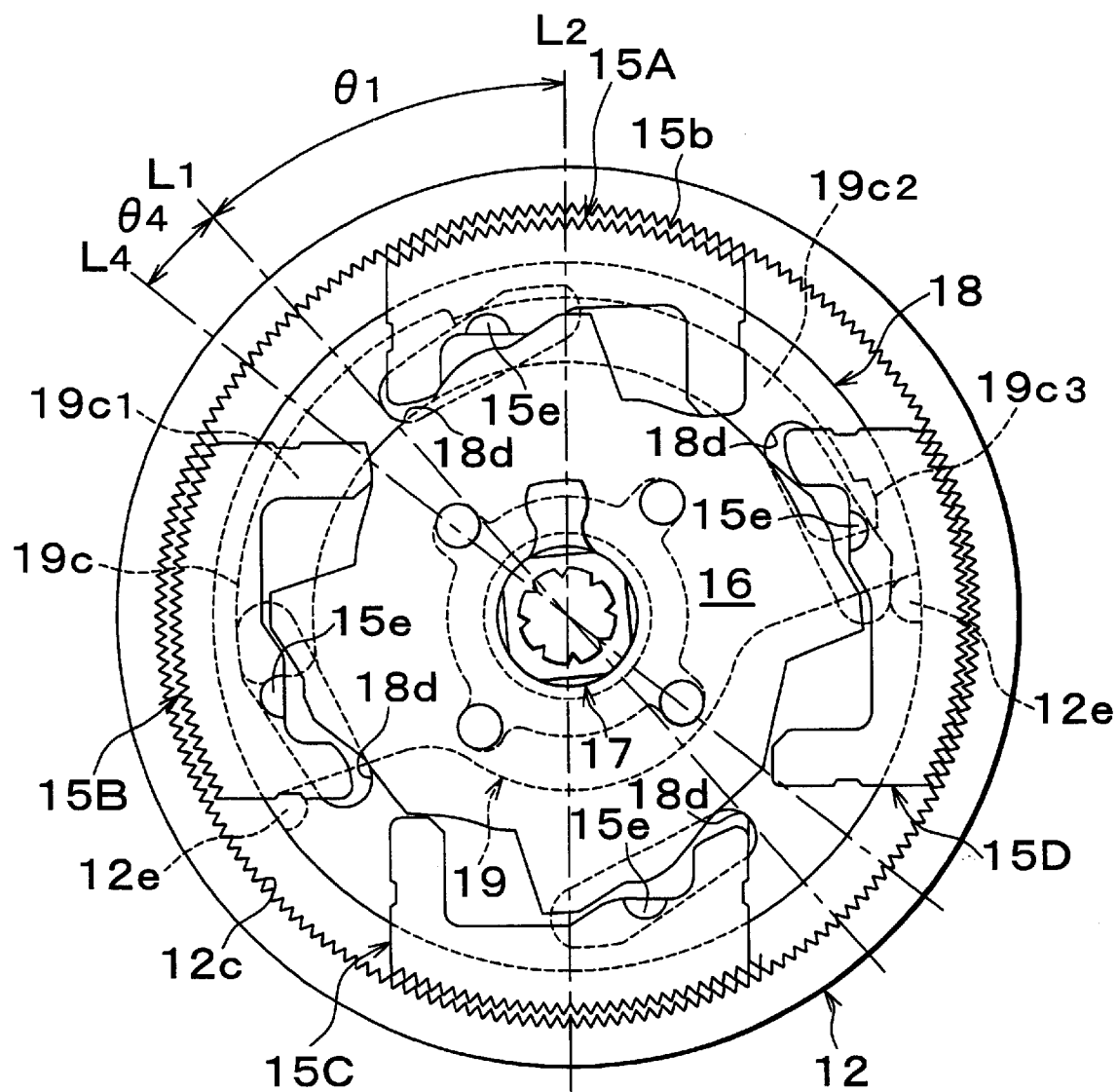
FIG. 4 is a front view of the reclining device that has been removed of some of the component members and that is in a state where the slide pawls are out of mesh with the ratchet.

Hereinafter, the invention will be described with reference to the drawings. FIG. 1 is a longitudinal sectional view of a reclining device 1 according to one exemplary example of the invention, and corresponds to a section-indicating line I—I in FIG. 3. FIG. 2 is an exploded perspective view of the reclining device 1. FIGS. 3 and 4 are front views of the reclining device 1 that has been removed of some of its component members. The reclining device 1 is designed for a vehicular reclining seat.

The reclining device 1 is composed of a stationary disc 11, a movable disc 12, a support shaft 13, a control lever 14, four slide pawls 15 (15A, 15B, 15C, 15D), a rotating cam 16, a control arm 17, a working plate 18, an unlock plate 19, a spiral spring 21, and a set plate 22. In this construction, the stationary disc 11 corresponds to a holder of the invention. The movable disc 12 is provided with a ratchet of the invention. The rotating cam 16 and the working plate 18 function as a cam body of the invention.

While the stationary disc 11 is mounted to a vehicular seat on the side of a seat cushion thereof, the movable disc 12 is mounted to the vehicular seat on the side of a seat back thereof The stationary disc 11 and the movable disc 12 are fitted to each other in a face-to-face manner. A front end portion of a tubular portion 22b of the set plate 22 that has been fitted from the side of the movable disc 12 is caulked onto an outer peripheral edge portion of the stationary disc 11, whereby the stationary disc 11 and the movable disc 12 are integrally connected with each other. As will be described later, the slide pawls 15, the rotating cam 16, the control arm 17, the working plate 18, the unlock plate 19, and the spiral spring 21 are accommodated in an accommodation space portion defined by the stationary disc 11 and the movable disc 12. The support shaft 13, which penetrates central portions of these component members, supports them either directly or indirectly via another component member. The control lever 14 is mounted to the support shaft 13 at an outer end portion thereof As shown in FIG. 2, the stationary disc 11 has a stepped circular recess 11b formed inside a disc body 11a. A guide groove 11c, which intersects cruciformly and extends lengthwise and widthwise, is formed in the circular recess 11b. The guide groove 11c is formed in such a manner as to be much deeper than the circular recess 11b. In the guide groove 11c, each of four outer corner portions of the intersecting portion constitutes a bearing wall portion 11d assuming a generally triangular shape. Each bearing wall portion 11d is as thick as the disc body 11a. A through-hole 11e and hanging grooves 11f are formed in the circular recess 11b at a central portion thereof As shown in FIG. 2, the movable disc 12 has a stepped circular recess 12b formed inside a disc body 12a. Inner teeth are formed along the entire inner peripheral face of an annular portion, which is an outer large-diameter portion of the circular recess 12b. The annular portion is formed in a ratchet 12c. The disc body 12a is dimensioned in such a manner as to be fitted snugly to the circular recess 11b of the stationary disc 11 when superposed on the stationary disc 11 on the inner side thereof. A through-hole 12d, which faces the through-hole 11e of the stationary disc 11, is formed in the circular recess 12b at a central portion thereof Furthermore, two engaging protrusion portions 12e are formed along the circumference of a center circle of the circular recess 12b at intervals of a certain distance. The engaging protrusion portions 12e maintain the unlock plate 19 to the movable disc 12.

Main constitutional parts of the slide pawls 15 (15A, 15B, 15C, 15D) are all identical in shape. The slide pawl 15A is different only in a specific function from the other pawls 15B, 15C, and 15D. Therefore, the following description of the slide pawls 15 (15A, 15B, 15C, 15D) will regard the slide pawl 15A as distinct from the slide pawls 15B, 15C, and 15D when it comes to the specific function of the slide pawl 15A. Otherwise, however, they will be comprehensively referred to as the slide pawls 15.

As shown in FIGS. 2 to 4, each of the slide pawls 15 has, at a generally arcuate apex portion of a slide pawl body 15a (radially outside when assembled), outer teeth 15b that can mesh with the ratchet 12c of the movable disc 12. The slide pawl 15 has a pair of left and right leg portions 15c (second leg portion) and 15d (first leg portion), which extend from the side opposite to the apex portion of the slide pawl body 15a (radially inside when assembled). The leg portions 15c, 15d are different in length. The left leg portion 15c (i.e. on the side of a locking direction) is shorter than the right leg portion 15d (i.e. on the side of an unlocking direction). Front end faces of the leg portions 15c, 15d are inclined in such a manner as to extend inwardly. The rotating cam 16 bears a middle bearing portion 15f, which is formed in an end face region between both the leg portions 15c, 15d in a rear end portion of the slide pawl 15a. Later-described bearing cam portions of the rotating cam 16 bear the leg portions 15c, 15d and the middle bearing portion 15f. A face that is in the middle bearing portion 15f and that abuts on the rotating cam 16 when the reclining device 1 is assembled and locked is formed in such a manner as to extend inclined to a direction in which the slide pawl 15 slides. Furthermore, a cam pin 15e, which is in the shape of a square pole and which protrudes toward the later-described working plate 18 when the reclining device 1 is in a state of assembly, is formed in the pawl body 15a at an end portion thereof that is relatively close to the leg portion 15c and that is on the side opposite to the apex portion. It is to be noted herein that the cam pin 15e of the slide pawl 15A is formed to be slightly longer than those of the other slide pawls 15.

The rotating cam 16 is a generally circular plate. As shown in FIGS. 2 to 4, the rotating cam 16 has four cam sets arranged circumferentially along an outer peripheral edge of the cam body 16a at equal intervals. Each cam set is composed of a first bearing cam portion 16b, a second bearing cam portion 16c, and a third bearing cam portion 16d. The bearing cam portion 16b is greater in radial height than the bearing cam portion 16c, which is greater in radial height than the bearing cam portion 16d. Each of the bearing cam portions 16b, 16c, and 16d has an inclined plane extending in a direction in which the rotating cam 16 rotates when it is locked. An apex of the bearing cam portion 16d is formed in such a manner as to be parallel to the middle bearing portion 15f When the reclining device 1 is assembled and locked, the apex of the bearing cam portion 16d abuts on the middle bearing portion 15f. A fitting hole 16e, which is generally identical in shape with the later-described control arm 17 and to which the control arm 17 can be fitted, is formed in the cam body 16a at a central portion thereof Four engaging protrusion portions 16f are formed at intervals of a certain distance along the circumference of a circle stretching around the center of rotation of the cam body 16a. When the reclining device 1 is in a state of assembly, the engaging protrusion portions 16f protrude toward the later-described working plate 18.

As shown in FIGS. 2 to 4, the control arm 17 has a cylindrical body 17a, which is provided with an engaging arm portion 17b that protrudes outwardly. The control arm 17 is generally identical in shape with the fitting hole 16e of the rotating cam 16. The cylindrical body 17a has an inner hole that is formed like a spline.

The working plate 18 assumes a circular shape. As shown in FIG. 2, the working plate 18 has a plate body 18a in which a circular through-hole 18b is formed at a central portion thereof Four engaging holes 18c, which are arranged circumferentially at intervals of a certain distance, are formed along an inner peripheral edge of the through-hole 18b. Four cam grooves 18d, which are arranged circumferentially at intervals of a certain distance, are formed in the plate body 18a on the side of an outer periphery thereof The cam grooves 18d assume a generally arcuate shape. That is, each of the cam grooves 18d gently extends from one end thereof to the center and reaches the other end thereof.

As shown in FIGS. 2 to 4, the unlock plate 19 is a generally semicircular fan-shaped plate. A through-hole 19b is formed in a main portion of a plate body 19b. An arcuate long hole 19c is formed on the side of an outer peripheral edge of the unlock plate 19 in such a manner as to extend along the outer peripheral edge. The long hole 19c has a stepped hole composed of a large-width hole portion 19c1, a small-width hole portion 19c2, and a large-width hole portion 19c3, which are arranged in this order in the left-to-right direction in the drawings. The long hole 19c is located facing corresponding ones of the cam grooves 18d of the working plate 18.

The spiral spring 21 has a predetermined number of turns. As shown in FIG. 2, an inner end portion 21a of the spiral spring 21 is wound rectangularly, and an outer end portion 21b of the spiral spring 21 protrudes outwardly. The inner end portion 21a is dimensioned in such a manner as to be fitted snugly onto the cylindrical body 17a of the control arm 17. The outer end portion 21b is formed in such a manner as to be hung on one of the hanging grooves 11f of the stationary disc 11.

As shown in FIG. 2, the set plate 22 has a tubular portion 22b extending along an outer peripheral edge portion of an annular plate body 22a. The set plate 22 is dimensioned such that it can be fitted onto the outer peripheral side of the stationary disc 11 from the side of the movable disc 12 when the stationary disc 11 and the movable disc 12 are fitted together. As shown in FIG. 1, when the set plate 22 is fitted on the movable disc 12 and the stationary disc 11, the front end portion of the tubular portion 22b is caulked to connect the stationary disc 11 and the movable disc 12 with each other.

These component members are assembled, for example, according to the following procedure to constitute the reclining device 1 shown in FIG. 1. That is, the support shaft 13 is passed through the through-hole 11e of the stationary disc 11. Then, the spiral spring 21, the control arm 17, the rotating cam 16, the slide pawls 15, the working plate 18, the unlock plate 19, and the movable disc 12 are mounted in this order on the support shaft 13 that has been passed through the through-hole 11e. Then, the set plate 22 is fitted onto the outer periphery of the stationary disc 11 from the side of the movable disc 12. Finally, the front end portion of the tubular portion 22b of the set plate 22 is caulked as shown in FIG. 1. Thus, the reclining device 1 is completed.

In this state of assembly, the outer end portion 21b of the spiral spring 21 is hung on one of the hanging grooves 11f of the stationary disc 11. The tubular body 17a of the control arm 17 has been inserted through a space defined by the inner end portion 21a of the spiral spring 21. The rotating cam 16 is fitted on the control arm 17. An engaging arm 17b of the control arm 17 is fitted in the fitting hole 16e of the rotating cam 16. The slide pawls 15 are disposed such that they can slide radially into the guide groove 11c of the stationary disc 11. The bearing wall portion 11d prevents a corresponding one of the slide pawls 15 from moving circumferentially. The slide pawls 15 are arranged in a crisscross manner on the side of the outer periphery of the rotating cam 16.

In the state of assembly, the middle bearing portion 15f of each of the slide pawls 15 abuts on the third bearing cam portion 16d of a corresponding one of the cam sets of the rotating cam 16. The front end portion of the leg portion 15d of each of the slide pawls 15 is located near the first bearing cam portion 16b of a corresponding one of the cam sets of the rotating cam 16. The front end portion of the leg portion 15c of each of the slide pawls 15 is located near the second bearing cam portion 16c of a corresponding one of the cam sets of the rotating cam 16. That is, while the middle bearing portion 15f abuts on the third bearing cam portion 16d, each of the leg portions 15d, 15c is spaced from a corresponding one of the first and second bearing cam portions 16b, 16c by a certain gap. When the slide pawls 15 assume this state, the outer teeth 15b of each of the slide pawls 15 mesh with a corresponding opposite portion of the ratchet 12c of the movable disc 12.

In this state of assembly, the working plate 18 is located facing the rotating cam 16, with the slide pawls 15 interposed therebetween. Each of the engaging protrusion portions 16f of the rotating cam 16 is in engagement with a corresponding one of the engaging holes 18c of the working plate 18. Thus, the working plate 18 is connected with the rotating cam 16 and can rotate together therewith. The cam pin 15e of each of the slide pawls 15 faces a corresponding one of the cam grooves 18d of the working plate 18. Thus, the cam pin 15e of each of the slide pawls 15 and the corresponding one of the cam grooves 18d of the working plate 18 constitute a cam mechanism for causing radial slide of the slide pawl 15.

In this state of assembly, the unlock plate 19 is located facing the slide pawls 15, with the working plate 18 interposed therebetween. Also, the unlock plate 19 is located in the circular recess 12b of the movable disc 12. In this state, each of circumferentially opposed end portions of the unlock plate 19 is in engagement with a corresponding one of the engaging protrusion portions 12e of the movable disc 12, whereby the unlock plate 19 is connected with the movable disc 12 such that they can rotate together circumferentially. The cam pin 15e of the slide pawl 15A faces the long hole 19c of the unlock plate 19 through a corresponding one of the cam grooves 18d of the working plate 18. Thus, the cam pin 15e of the slide pawl 15A and the long hole 19c of the unlock plate 19 constitute a cam mechanism for causing radial slide of the slide pawl 15A.

Next, the operation of the reclining device 1 will be described with reference to FIGS. 3 to 8. FIGS. 3 and 4 are front views of the reclining device 1 that has been removed of the stationary disc 11, the support shaft 13, and the spiral spring 21. FIG. 3 shows a state where the slide pawls 15 are in mesh with the ratchet 12c of the movable disc 12 so that the seat back (not shown) is locked with respect to the seat cushion. FIG. 4 shows a state where the slide pawls 15 have been retreated from the ratchet 12c by turning the control lever 14 so that the slide pawls 15 are out of mesh with the ratchet 12c.

FIGS. 5 to 8 show how the movable disc 12, the ratchet 12c, the slide pawls 15, and the unlock plate 19 are operationally related to one another during operation of the reclining device 1. FIGS. 5 to 8 are front views of the reclining device 1 that has been removed of the component members other than the movable disc 12, the ratchet 12c, the slide pawls 15, and the unlock plate 19.

The middle bearing portions 15f of the slide pawls 15 abut on the bearing cam portions 16b of the rotating cam 16 and the tip of leg portions 15c, 15d locate near the bearing cam portions 16b, 16c as shown in FIG. 3 when the control lever 14 is turned to lock. The slide pawls 15 mesh with a corresponding opposite portion of the ratchet 12c of the movable disc 12. An elastic force of the spiral spring 21 is applied to the rotating cam 16 via the control arm 17 counterclockwise in FIG. 3, so that the rotating cam 16 is maintained at such an angle as to allow abutment on the slide pawls 15. As a result, the slide pawls 15 maintain the mesh with the ratchet 12c. This state of mesh prevents the stationary disc 11 and the movable disc 12 of the reclining device 1 from rotating relative to each other, and thus creates a state where the seat back is locked with respect to the seat cushion. Consequently, the state of mesh prevents the seat back from being tilted longitudinally with respect to the seat cushion.

When the reclining device 1 is in a state of mesh as shown in FIG. 3, the seat back stands upright with respect to the seat cushion at a foremost tilt position (first-stage lock position). The cam pin 15e of the slide pawl 15A, which is the only one connected with the unlock plate 19, is located at a border step portion which is in the large-width hole portion 19c1 of the long hole 19c of the unlock plate 19 and which constitutes a border with the small-width hole portion 19c2.

When the reclining device 1 is in this state of mesh, the control lever 14 is turned to unlock the seat back from the seat cushion. Then, the control arm 17 rotates clockwise in FIG. 3, and causes the rotating cam 16 to rotate clockwise by a predetermined amount. As a result, the middle bearing portion 15f of each of the slide pawls 15 are respectively brought out of abutment on the bearing cam portions 16d of the cam sets of the rotating cam 16. And the leg portions 15d and 15c of each of the slide pawls 15 are respectively brought out of abutment on the bearing cam portions 16b and 16c of a corresponding one of the cam sets of the rotating cam 16. Thus, the rotating cam 16 is released from the slide pawls 15. The rotating cam 16 frees the slide pawls 15 to move radially inwardly. The working plate 18 rotates together with the rotating cam 16. Herein, the working plate 18 radially inwardly presses the cam pin 15e of each of the slide pawls 15 with a radially outside inner peripheral face of a corresponding one of the cam grooves 18d, thus causing slide of the slide pawl 15. Then, the working plate 18 retreats the slide pawls 15 from the ratchet 12c, thus bringing the slide pawls 15 out of mesh with the ratchet 12c. FIG. 4 shows a state where the slide pawls 15 have been retreated from the ratchet 12c and brought out of mesh therewith.

In the state where the slide pawls 15 have been brought out of mesh with the ratchet 12c, the movable disc 12 can rotate relative to the stationary disc 11 both clockwise and counterclockwise. The seat back has been unlocked from the seat cushion. Hence, the seat back can be tilted longitudinally with respect to the seat cushion. More specifically, the seat back can be tilted backwards until it becomes substantially horizontal, and can be tilted forwards until it is folded down onto the seat cushion in a substantially horizontal posture.

The reclining device 1 is designed such that, if the seat back is tilted backwards with respect to the seat cushion, the movable disc 12 assuming a position shown in FIG. 3, turns clockwise. After the movable disc 12 has turned by a predetermined amount, the operation of turning the control lever 14 is canceled. Then, the support shaft 13 and the control arm 17 turn counterclockwise due to an elastic force of the spiral spring 21. Then, the rotating cam 16 resumes rotating counterclockwise, moves the slide pawls 15 toward the ratchet 12c, and brings them into mesh therewith. Thus, the movable disc 12 is prevented from rotating relative to the stationary disc 11, while a seat back is locked with respect to a seat cushion at a desired tilt angle and maintained in this state.

The reclining device 1 is designed such that, while the movable disc 12 turns, the cam pin 15e of the slide pawl 15A moves within the long hole 19c of the unlock plate 19. While the cam pin 15e moves within the large-width hole portion 19c1 of the long hole 19c, the rotating cam 16 moves the slide pawls 15 toward the ratchet 12c and brings them into mesh therewith. The slide pawls 15 can be brought out of mesh with the ratchet 12c by turning the control lever 14. Accordingly, the tilt angle of the seat back with respect to the seat cushion can be adjusted arbitrarily. In the meantime, the movable disc 12, the ratchet 12c, the slide pawls 15, and the unlock plate 19 shift from the state shown in FIG. 5 to the state shown in FIG. 6.

Figure 5:
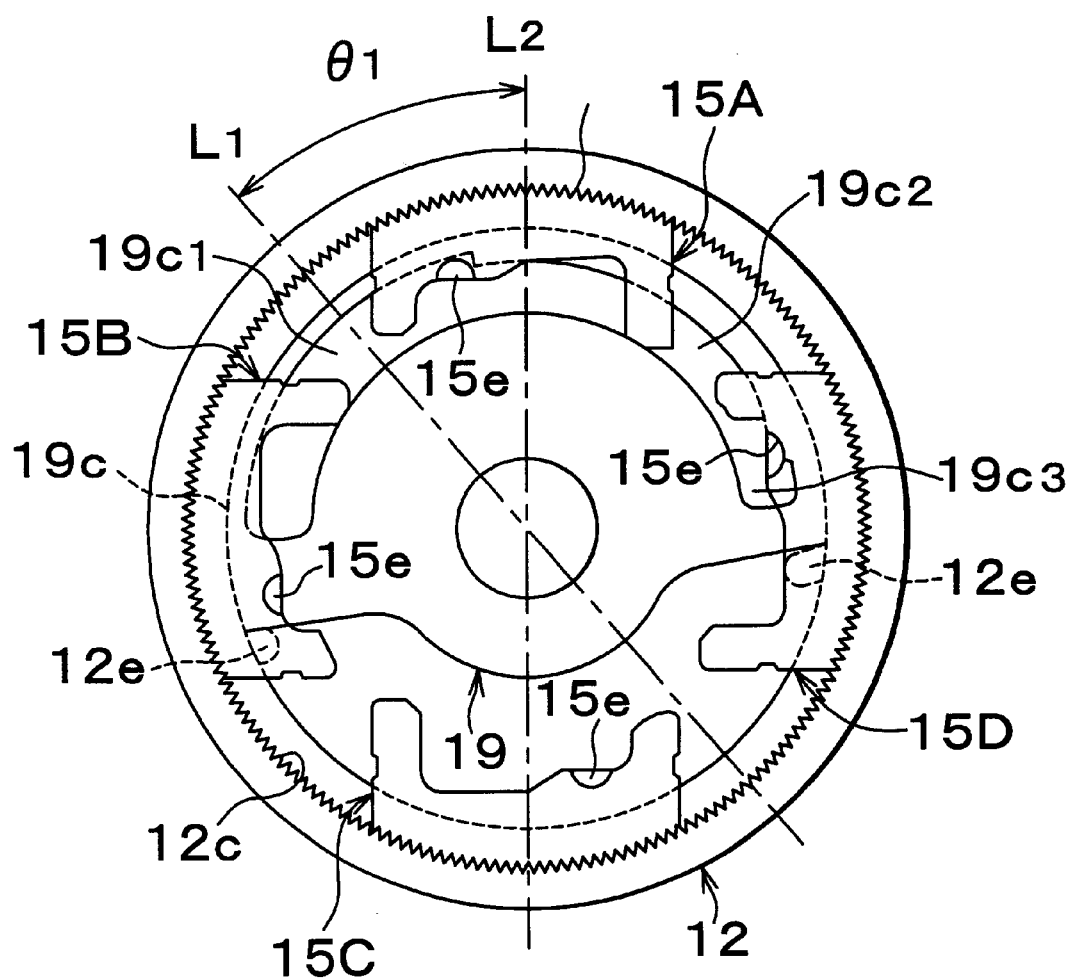
FIG. 5 is a front view of the reclining device in which a movable disc, the slide pawls, the ratchet, and an unlock plate assume one operational state.
Figure 6:
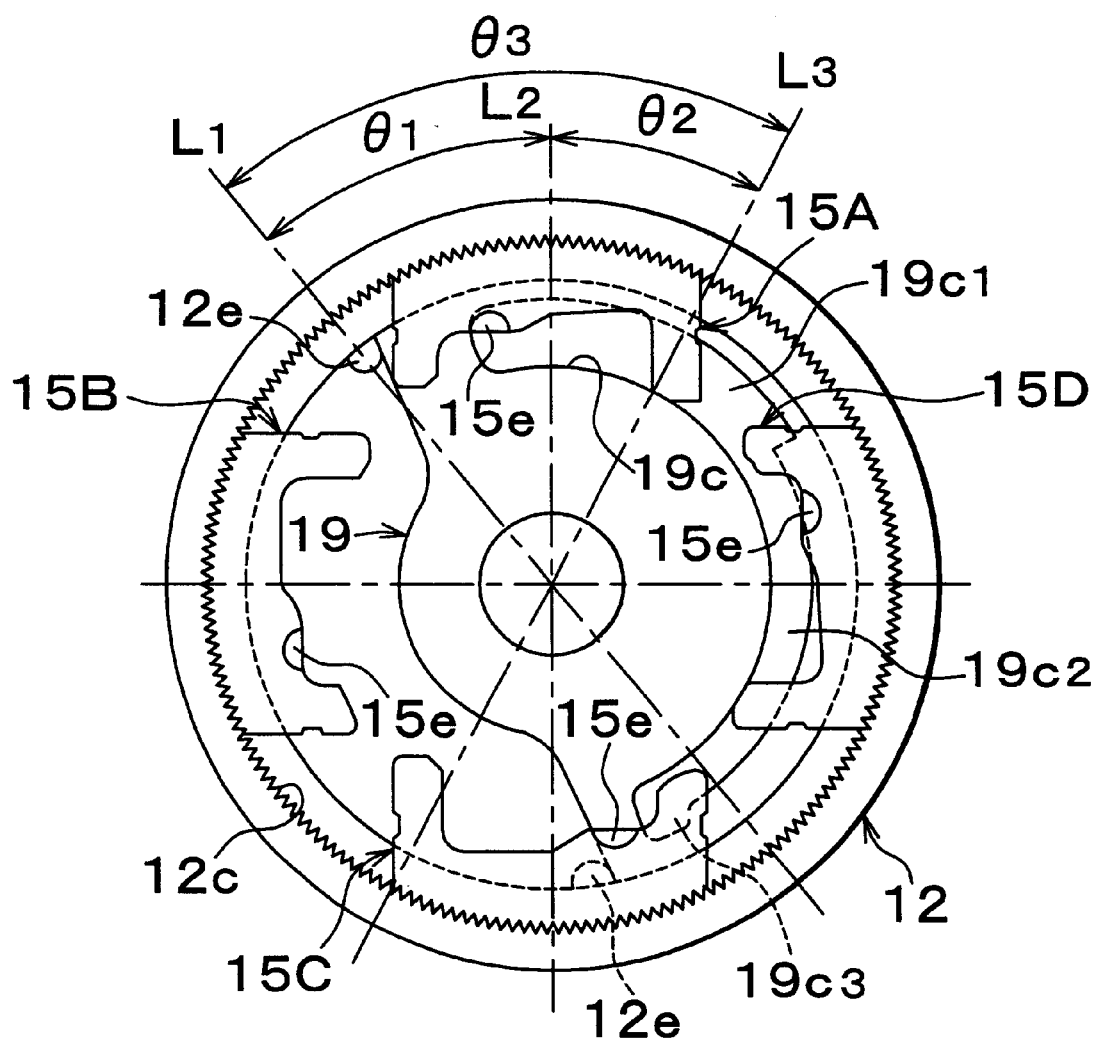
FIG. 6 is a front view of the reclining device that assumes another operational state.

FIG. 5 is a drawing corresponding to FIG. 3. A base line L1 in FIG. 5 indicates the first-stage lock position of the seat back. A base line L3 in FIG. 6 indicates a last-stage lock position of the seat back. The reclining device 1 is designed such that the tilt angle of the seat back can be adjusted within an angular range $\theta 3$ that is composed of an angular range $\theta 1$ defined by the base line L1 and a base line L2 and an angular range $\theta 2$ defined by the base lines L2, L3. The seat back is designed to stand substantially upright when it is at the first-stage lock position corresponding to the base line L1.

If the seat back is folded down onto the seat cushion in a substantially horizontal posture when the reclining device 1 is in the state of mesh shown in FIG. 3, the control lever 14 is turned to rotate the rotating cam 16 and the working plate 18 clockwise by a predetermined amount. Thus, the slide pawls 15 are retreated from the ratchet 12c and brought out of mesh therewith. Thus, the movable disc 12 becomes capable of rotating with respect to the stationary disc 11 and makes it possible to turn the seat back forwards with respect to the seat cushion. If the seat back is thus turned forwards, the movable disc 12 turns the unlock plate 19 counterclockwise in an integral manner. Then, as shown in FIG. 4, the cam pin 15e of the slide pawl 15A moves from the large-width hole portion 19c1 to the small-width hole portion 19c2 in the long hole 19c of the unlock plate 19. If the seat back is turned further forwards, the cam pin 15e proceeds in the small-width hole portion 19c2 and reaches the large-width hole portion 19c3, which is the furthest end portion of the long hole 19c.

If the cam pin 15e of the slide pawl 15A moves from the large-width hole portion 19c1 to the small-width hole portion 19c2 in the long hole 19c of the unlock plate 19, the cam pin 15e becomes engaged with the small-width hole portion 19c2, so that the slide pawl 15A is maintained in retreat from the ratchet 12c. The leg portion 15c of the slide pawl 15A abuts on the bearing cam portion 16c of a corresponding one of the cam sets of the rotating cam 16, whereby the rotating cam 16 is prevented from rotating counterclockwise. Accordingly, the other slide pawls 15B, 15C, and 15D are also maintained in retreat from the ratchet 12c. Thus, even if the operation of turning the control lever 14 is canceled, all the slide pawls 15 can be maintained out of mesh with the ratchet 12c. This state is maintained as long as the cam pin 15e is located in the small-width hole portion 19c2 of the long hole 19c. In the meantime, the movable disc 12 is free to move with respect to the stationary disc 11, whereby the seat back can be tilted forwards until it is folded down onto the seat cushion in a substantially horizontal posture. In the meantime, the movable disc 12, the ratchet 12c, the slide pawls 15, and the unlock plate 19 shift from the state shown in FIG. 5 to the state shown in FIG. 7 and then assume the state shown in FIG. 8.

Figure 7:
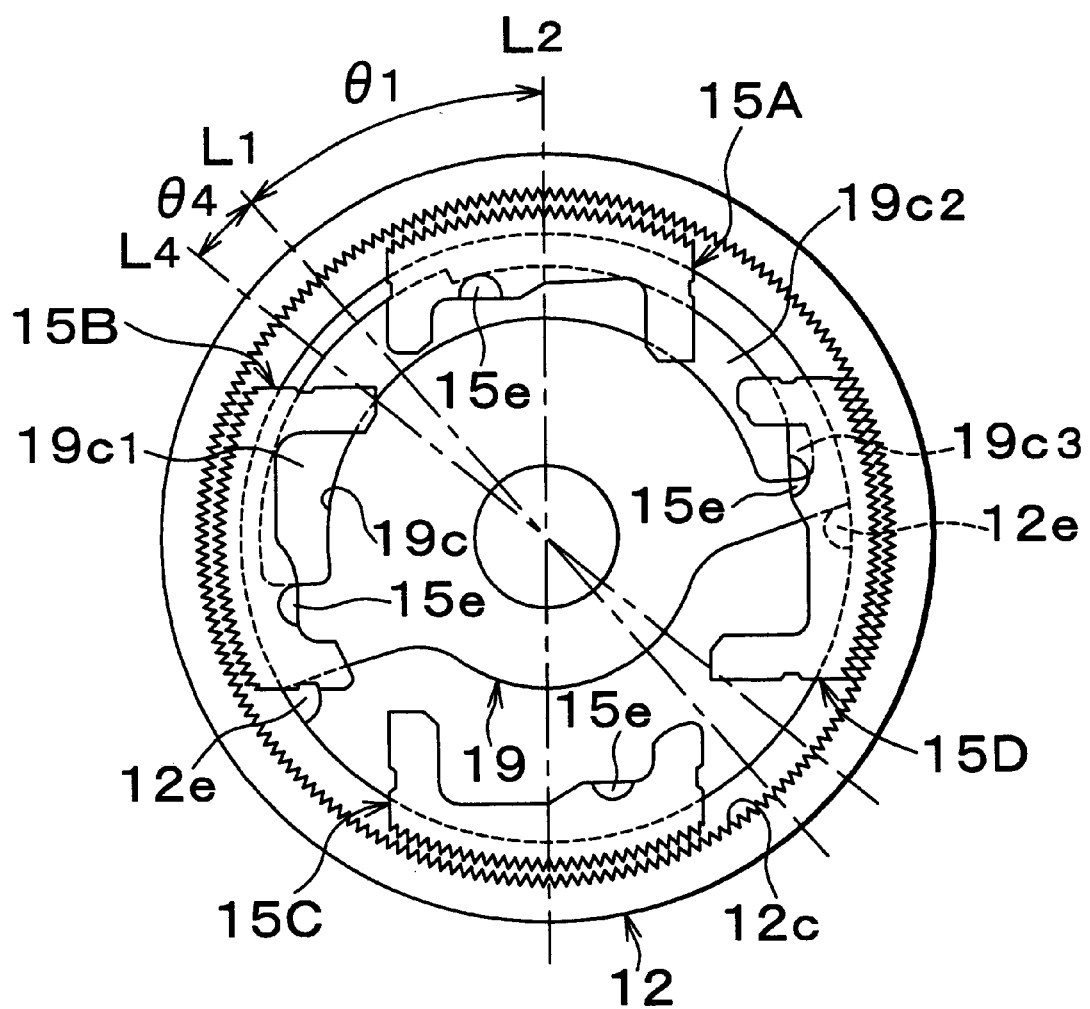
FIG. 7 is a front view of the reclining device that assumes still another operational state.

FIG. 7 is a drawing corresponding to FIG. 4. A base line L4 in FIG. 7 indicates a turning position of the seat back upon transition of the cam pin 15e of the slide pawl 15A from the large-width hole portion 19c1 to the small-width hole portion 19c2 of the unlock plate 19. As soon as the seat back turns by an angle θ4 from the base line L1 to the base line L4, the cam pin 15e of the slide pawl 15A moves into the small-width hole portion 19c2 of the unlock plate 19. A base line L5 in FIG. 8 indicates a turning position of the seat back that has been folded down furthest forwards. The seat back is designed to be folded down in a substantially horizontal posture as soon as it turns by an angle θ5 (including the angle θ4) from the base line L1 to the base line L5.

Figure 8:
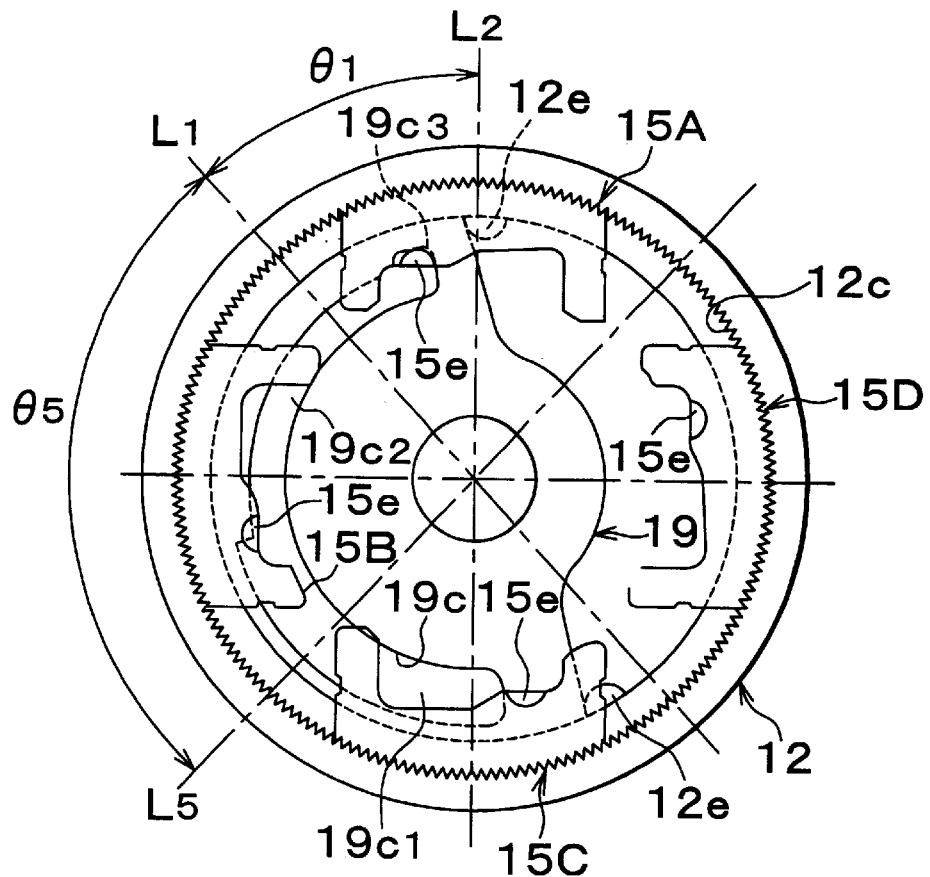
FIG. 8 is a front view of the reclining device that assumes still another operational state.

If the seat back is tilted forwards and folded down onto the seat cushion in a substantially horizontal posture, the cam pin 15e of the slide pawl 15A moves from the small-width hole portion 19c2 to the large-width hole portion 19c3 as shown in FIG. 8. The large-width hole portion 19c3 is the furthest end portion of the long hole 19c of the unlock plate 19. If the cam pin 15e of the slide pawl 15A moves into the large-width hole portion 19c3, the cam pin 15e is disengaged from the small-width hole portion 19c2. Thus, the slide pawl 15A becomes capable of moving toward the ratchet 12c. Then, the rotating cam 16 and the working plate 18 resume turning counterclockwise due to an elastic force of the spiral spring 21, move the slide pawls 15 toward the ratchet 12c, and bring them into mesh therewith. Thus, the movable disc 12 is locked with respect to the stationary disc 11. Consequently, the seat back is locked while being folded down on the seat cushion in a substantially horizontal posture.

To return the seat back that has been tilted forwards and folded down to the upright position, the control lever 14 is turned to retreat the slide pawls 15 assuming the state of mesh shown in FIG. 8 from the ratchet 12c and bring them out of mesh therewith. Then, the seat back is turned backwards by a predetermined amount. The operation of turning the control lever 14 is canceled to turn the seat back further backwards. When the seat back is turned backwards, the cam pin 15e of the slide pawl 15A has already moved into the small-width hole portion 19c 2 of the long hole 19c of the unlock plate 19. Therefore, the movable disc 12 is free to move with respect to the stationary disc 11 and allows the seat back to turn backwards.

The reclining device 1 is designed such that, if the seat back reaches the base line L1 via the base line L4, the cam pin 15e of the slide pawl 15A moves into the large-width hole portion 19c1 of the unlock plate 19 and that the cam pin 15e of each of the slide pawls 15 is then disengaged. Then, the slide pawls 15 move toward the ratchet 12c due to an elastic force of the spiral spring 21 and come into mesh with the ratchet 12c. Thus, the seat back is locked with respect to the seat cushion at the first-stage lock position defined by the base line L1, and is maintained in a standing posture at a predetermined tilt angle.

Thus, the reclining device 1 is designed such that, if the unlock plate 19 maintains the slide pawl 15A as a specific one of the slide pawls in retreat in such a direction as to bring it out of mesh with the ratchet 12c, the slide pawl 15A activates the working plate 18 and the rotating cam 16 to maintain the slide pawls 15 in retreat in such a direction as to bring them out of mesh with the ratchet 12c and thus to establish a state where the slide pawls 15 are out of mesh with the ratchet 12c.

Hence, only if the unlock plate 19 maintains one of the slide pawls 15, namely, the slide pawl 15A in retreat, when it becomes possible to establish a free zone for each of the slide pawls 15. Such a free zone can be established even if the angular range for bringing the slide pawl 15A out of mesh with the ratchet 12c and the angular range for bringing the adjacent slide pawls 15B, 15D into mesh with the ratchet 12c overlap with each other in a plan view.

The reclining device 1 is designed to constitute a vehicular reclining seat by being mounted to a hinge portion that connects the seat cushion with the seat back. As will be described below, the reclining device 1 is designed to suit the vehicular reclining seat.

That is, as shown in FIGS. 5 to 8, the reclining device 1 is designed (1) to establish a lock state where the slide pawls 15 can mesh with the ratchet 12c on the side where the angle of the seat back with respect to the seat cushion is larger than a predetermined angle (on the side of the base lines L2, L3 with respect to the base line L1), (2) to establish an unlock state where the slide pawls 15 cannot mesh with the ratchet 12c on the side where the angle of the seat back with respect to the seat cushion is smaller than the predetermined angle (on the side of the base lines L4, L5 with respect to the base line L1), and (3) to establish a lock state where the slide pawls 15 are in mesh with the ratchet 12c at the position where the angle of the seat back with respect to the seat cushion assumes its minimum value (at the position indicated by the base line L5).

Accordingly, the vehicular reclining seat employing the reclining device 1 can establish a lock state if the seat back is folded down toward the seat cushion until the angle formed therebetween is minimized, namely, if the seat back assumes the turning position indicated by the base line L5 and becomes substantially horizontal. Thus, as long as the seat back is locked in a substantially horizontal posture, unstable vibration of the seat back can be prevented even if the vehicle is exposed to external vibration while traveling. Because a back portion of the seat back is locked in a substantially horizontal posture and prevented from vibrating unstably, it is possible to use the back portion of the seat back as a table.

Figure 9:
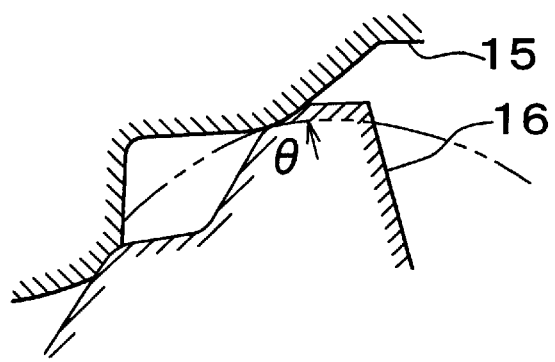
FIG. 9 is an explanatory view of inclination of a surface of abutment between one of the slide pawls and a cam body front view of the reclining device that assumes still another operational state.

The reclining device 1 demonstrates various operations and effects as described above when applied to a vehicular reclining seat. In particular, each of the slide pawls 15 has the slide pawl body 15a, which has at opposed ends thereof the left leg portion 15c and the right leg portion 15d. The outer teeth 15b are formed on the front end side of the slide pawl body 15a. The leg portions 15c, 15d extend from the slide pawl body 15a on the rear end side thereof, that is, on the side opposite to the region where the outer teeth 15b are formed. The third bearing cam portion 16d of the rotating cam 16 bears the middle bearing portion 15f, which is formed in the middle portion of the slide pawl body 15a on the rear end side thereof. Each of the leg portions 15c, 15d are spaced from the rotating cam 16 by a minute gap. Such a configuration ensures that the rotating cam 16 bears each of the slide pawls 15 at the middle bearing portion 15f when the slide pawls 15 mesh with (locked with respect to) the ratchet 12c.(see FIG. 9)

The effects that are achieved by such a construction in the case where a great circumferential turning force is applied to the slide pawls 15 from the ratchet 12c, for example, in the case where the vehicle is exposed to an impact from behind due to a rear-end collision will be described. This turning force is applied to the slide pawls 15 via the ratchet 12c clockwise in the drawings. The turning force is distributed to the slide pawls 15A, 15B, 15C, and 15D. Then, the turning force is applied to the slide pawls 15 clockwise in the drawings. As a result, each of the slide pawls 15 tilts clockwise upon the middle bearing portion 15f that abuts on the first bearing cam portion 16b of a corresponding one of the cam sets of the rotating cam 16. Then, the leg portion 15d comes into abutment on the first bearing cam portion 16b, so that the first and third bearing cam portions 16b, 16d, which abut on the leg portion 15d and the middle bearing portion 15f respectively, bear each of the slide pawls 15 at two points. Hence, the supporting state of the slide pawls 15 with respect to the rotating cam 16 is far more stable as compared with the case where a turning force from the ratchet 12c is centered on a single one of the bearing portions. Even a radially acting force as a component of the turning force does not retreat the slide pawls 15 from the ratchet 12c. The slide pawls 15 are stably maintained in mesh with the ratchet 12c. Accordingly, the slide pawls 15 cannot be disengaged from the ratchet 12c easily and thus can be prevented from being unlocked.

The same holds true for the opposite case where the vehicle is exposed to a frontal impact so that a force is applied to the slide pawls 15 via the seat back and the ratchet 12c counterclockwise in the drawings. In this case, the leg portion 15c of each of the slide pawls 15 that have tilted clockwise comes into abutment on the second bearing cam portion 16c of a corresponding one of the cam sets of the rotating cam 16, so that the second and third bearing cam portions 16c, 16d, which abut on the leg portion 15c and the middle bearing portion 15f respectively, bear each of the slide pawls 15 at two points.

Such a construction makes it possible to bring a substantially central portion of the outer teeth 15b of each of the slide pawls 15 into mesh with the ratchet 12c while maintaining a good balance when the slide pawls 15 come into mesh with the ratchet 12c.

The reclining device 1 is designed such that, when the slide pawls 15 are in mesh with the ratchet 12c, each of the leg portions 15d, 15c of each of the slide pawls 15 is spaced from a corresponding one of the first and second bearing cam portions 16b, 16c of a corresponding one of the cam sets of the rotating cam 16 by a minute gap. Hence, when the slide pawls 15 are locked with respect to the ratchet 12c, the third bearing cam portion 16d of each of the cam sets of the rotating cam 16 bears a corresponding one of the slide pawls 15 at the middle bearing portion 15f rather than at the leg portions 15c, 15d. Thus, the entire outer teeth 15b of each of the slide pawls 15 can be brought into mesh with the ratchet 12c while maintaining a good lateral balance.

In addition, the reclining device 1 is designed such that the middle bearing portion 15f of each of the slide pawls 15 is deflected in the locking direction from the central portion of the slide pawl body 15a. This exemplary aspect makes it possible to create a space for the slide pawl body 15a on the side of the unlocking direction. Thus, it is possible to ensure a relatively large area where the third bearing cam portion 16d of each of the cam sets of the rotating cam 16 does not bear a corresponding one of the slide pawls 15 at the middle bearing portion 15f, and to increase the rotational angle to be covered by the rotating cam 16 for a locking operation.

Thus, even if the positional precision of the rotating cam 16 with respect to the slide pawls 15 in the rotational direction is not high enough, it is possible to perform locking and unlocking operations stably.

The reclining device 1 is designed such that each of the second and third bearing cam portions 16c, 16d of each of the cam sets of the rotating cam 16, which respectively correspond to the second leg portion 15c and the middle bearing portion 15f of a corresponding one of the slide pawls 15 on the side of the locking direction, has an inclined plane extending in a direction in which the rotating cam 16 rotates when it is locked. This exemplary aspect makes it possible to continuously apply a pressing force to the slide pawls 15 over an extensive angular range as the rotating cam 16 rotates in the locking direction. Thus, even if there is an error in the positions of the slide pawls 15 in respect of the rotational angle of the rotating cam 16 or in the dimension between the outer teeth 15b of each of the slide pawls 15 and the inner teeth of the ratchet 12c, the slide pawls 15 can be brought into mesh with the ratchet 12c and locked with respect thereto without being affected by such an error.

Furthermore, the inclined plane may be swollen so that the area of abutment between the rotating cam 16 and each of the slide pawls 15 can be reduced. Thus, the frictional force generated between the rotating cam 16 and each of the slide pawls 15 can be reduced. Therefore, it is possible to convert rotating movements of the rotating cam 16 into sliding movements of the slide pawls 15 efficiently.

The reclining device 1 may also be designed such that there is a gap only between the leg portion 15d (the first leg portion) of each of the slide pawls 15 on the side of the unlocking direction and the first bearing cam portion 16b of a corresponding one of the cam sets of the rotating cam 1.6 when the slide pawls 15 are locked with respect to the ratchet 12c. In this exemplary aspect, if a great circumferential turning force is applied to the slide pawls 15 from the ratchet 12c, the slide pawls 15 may move toward the rotating cam 16 due to a radial component of the turning force. The abutment of the second leg portion 15c on the side of the locking direction takes place prior to abutment of the first leg portion 15d on the side of the unlocking direction. This order of precedence is based on the following reason. That is, if the first leg portion 15d comes into abutment on the first bearing cam portion 16b of a corresponding one of the cam sets of the rotating cam 16 prior to the second leg portion 15c, such a torque as to rotate the rotating cam 16 in the unlocking direction is generated to the extent of weakening the pressing force exerted by the rotating cam 16 to press the slide pawls 15 against the ratchet 12c.

The reclining device 1 may also be designed such that, when the slide pawls 15 are in mesh with the ratchet 12c, the rotating cam 16 bears each of the slide pawls 15 simultaneously at three points, namely, at the leg portions 15c, 15d and the middle bearing portion 15f. Thus, even in the event of application of a great circumferential turning force to the slide pawls 15 from the ratchet 12c, the turning force is distributed to the entire slide pawls 15, so that the three bearing cam portions of each of the cam sets of the rotating cam 16, namely, the first, second, and third bearing cam portions 16b, 16c, and 16d bear the leg portions 15c, 15d and the middle bearing portion 15f of a corresponding one of the slide pawls 15 respectively. Hence, the supporting state of the slide pawls 15 with respect to the rotating cam 16 is far more stable as compared with the case where a turning force from the ratchet 12c is centered on a single one of the bearing portions. Further, even if a great turning force is applied to the slide pawls 15 from the ratchet 12c, the slide pawls 15 do not retreat from the ratchet 12c and are stably maintained in mesh therewith. In other words, the slide pawls 15 cannot be disengaged from the ratchet 12c easily and can be prevented from being unlocked. Furthermore, even if a great circumferential turning force is applied to the pawls from the ratchet, the middle portions of the pawls are prevented from yielding radially inwardly. That is, the entire outer teeth of the pawls are stably maintained in mesh with the ratchet.

While the invention has been described with reference to preferred embodiments thereof, it is to be understood that the invention is not limited to preferred embodiments or constructions. To the contrary, the invention is intended to cover various modifications and equivalent arrangements. In addition, while the various elements of the preferred embodiment are shown in various combinations and configurations, which are exemplary, other combinations and configurations, including more, less or only a single element, are also within the spirit and scope of the invention.

What is claimed is:

1. A reclining device, comprising:
    a plurality of pawls, each having outer teeth formed in a first end portion on one side, first and second leg portions formed in a second end portion on another side opposite to the first end portion where the outer teeth are formed and a middle bearing portion formed between the first and second leg portions;
    an annular ratchet having, on a side of an inner periphery thereof, inner teeth meshing with the outer teeth;
    a rotating cam body which comes into abutment on the middle bearing portion of each of the pawls, the rotating cam body having first and second bearing portions to receive the first and second leg portions respectively, and the rotating cam body pressing the pawl toward the ratchet so that the pawl is brought into mesh with the ratchet and locked with respect thereto, and the rotating cam body stops pressing the pawl so that the pawl is unlocked from the ratchet; and
    a holder which holds each of the pawls such that the pawls can move toward and away from the inner teeth of the ratchet, wherein:
        when the pawls are locked with respect to the ratchet, the first leg portion located on the side of a direction in which the cam body rotates during the unlocking of the pawls and the first bearing portion of the rotating cam body corresponding to the first leg portion are spaced from each other by a greater distance than the second leg portion, and the second bearing portion of the rotating cam body corresponding to the second leg portion, and
        at least four pawls are provided, a length of the first leg portion is longer than the second leg portion, and each of the pawls is provided such that the first leg portion of one of the pawls is adjacent to the second leg portion of another one of the pawls.

2. The reclining device according to claim 1, wherein the middle bearing portion is located forward of a middle position between the first and second leg portions in a direction in which the rotating cam body moves during the locking of the pawls.

3. The reclining device according to claim 1, wherein at least one of the first bearing portion of the rotating cam body corresponding to the first leg portion, the second bearing portion of the rotating cam body corresponding to the second leg portion, and a third bearing portion of the rotating cam body for bearing the middle bearing portion has an inclined plane extending in a direction in which the rotating cam body moves during the locking of the pawls.

4. The reclining device according to claim 3, wherein the inclined plane has a curved surface that is enlarged radially outwardly.

5. The reclining device according to claim 1, wherein each of the first leg portion, the second leg portion, and the middle bearing portion of each of the pawls has an inclined plane corresponding to the rotating cam body.

6. The reclining device according to claim 5, wherein the inclined plane has a curved surface that is enlarged toward the rotating cam body.

7. The reclining device according to claim 1, wherein the rotating cam body is in contact with at least three points of each of the pawls when the outer teeth are meshed with the inner teeth.

8. A reclining device comprising:
    a plurality of pawls, each having outer teeth formed in a first end portion on one side, first and second leg portions projected in a second end portion on another side opposite to the first end portion where the outer teeth are formed and a middle bearing portion formed between the first and second leg portions;
    an annular ratchet having on an inner peripheral side thereof inner teeth that mesh with the outer teeth;
    a holder which holds each of the pawls such that the pawls can move toward and away from the inner teeth of the ratchet; and
    a cam body that has first, second and third bearing portions to receive the first and second leg portions and the middle bearing portion of the pawl, respectively, and the cam body presses the pawl toward the ratchet so that the pawl is brought into mesh with the ratchet and locked with respect thereto to prevent the holder and the ratchet from rotating relative to each other, and the cam body stops pressing the pawl so that the pawl unlocks from the ratchet to allow the holder and the ratchet to rotate relative to each other, wherein:
        when the pawls are locked with respect to the ratchet, a gap exists between the first leg portion located on a side of a direction in which the cam body rotates during the unlocking of the pawls and a first bearing portion of the cam body corresponding to the first leg portion; and
        at least four pawls are provided, a length of the first leg portion is longer than the second leg portion, and each of the pawls is provided such that the first leg portion of one of the pawls is adjacent to the second leg portion of another one of the pawls.

9. The reclining device according to claim 8, wherein the middle bearing portion is located forward of a middle position between the first and second leg portions in a direction in which the cam body moves during the locking of the pawls.

10. The reclining device according to claim 8, wherein the first bearing portion of the cam body corresponding to the first leg portion, the second bearing portion of the cam body corresponding to the second leg portion, and a third bearing portion of the cam body for bearing the middle bearing portion has an inclined plane extending in a direction in which the cam body moves during the locking of the pawls.

* * * * *